US009237575B2

(12) United States Patent
Nakao et al.

(10) Patent No.: US 9,237,575 B2
(45) Date of Patent: *Jan. 12, 2016

(54) BASE STATION, TERMINAL, BAND ALLOCATION METHOD, AND DOWNLINK DATA COMMUNICATION METHOD

(71) Applicant: Panasonic Intellectual Property Corporation of America, Torrance, CA (US)

(72) Inventors: Seigo Nakao, Kanagawa (JP); Katsuhiko Hiramatsu, Kanagawa (JP); Akihiko Nishio, Osaka (JP); Daichi Imamura, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/550,790

(22) Filed: Nov. 21, 2014

(65) Prior Publication Data

US 2015/0078313 A1    Mar. 19, 2015

Related U.S. Application Data

(63) Continuation of application No. 13/056,617, filed as application No. PCT/JP2009/003682 on Aug. 3, 2009, now Pat. No. 8,923,221.

(30) Foreign Application Priority Data

Aug. 4, 2008 (JP) ................................. 2008-201006

(51) Int. Cl.
*H04W 72/04* (2009.01)
*H04L 5/00* (2006.01)
(Continued)

(52) U.S. Cl.
CPC ......... *H04W 72/0453* (2013.01); *H04L 5/0053* (2013.01); *H04L 27/2647* (2013.01);
(Continued)

(58) Field of Classification Search
CPC .......... H04W 72/042; H04W 72/0413; H04W 24/10; H04W 24/02; H04W 72/0453; H04W 72/04; H04W 74/002
USPC ......... 370/329, 280, 252, 336, 330, 312, 229, 370/235
See application file for complete search history.

(56) References Cited

U.S. PATENT DOCUMENTS 7,983,292 B2 * 7/2011 Higuchi et al. ............... 370/442
2006/0077923 A1 * 4/2006 Niwano ....................... 370/328
(Continued)

FOREIGN PATENT DOCUMENTS

EP     1 976 168 A1    10/2008
JP     2006-304312 A    11/2006
(Continued)

OTHER PUBLICATIONS

R1-082575 LTE-Advanced Technologies, Jul. 2008.*
(Continued)

*Primary Examiner* — Un C Cho
*Assistant Examiner* — Oussama Roudani
(74) *Attorney, Agent, or Firm* — Seed IP Law Group PLLC

(57) ABSTRACT

Provided are a base station, a terminal, a band allocation method, and a downlink data communication method with which bands can be efficiently allocated. In a base station in which a plurality of unit bands can be allocated to a single communication, when a data receiver acquires terminal capability information transmitted by a terminal in the initial access unit band and the bandwidth available for communication indicated by the terminal capability information can accommodate a plurality of unit bands, a unit band group which includes the initial access unit band as well as the unit bands adjacent thereto is allocated to the terminal, and a communication band movement indication, which indicates the movement of the center frequency in the communication band of the terminal toward the center frequency in the unit band group, is transmitted to the terminal using the initial access unit band.

16 Claims, 10 Drawing Sheets

(51) Int. Cl.
*H04L 27/26* (2006.01)
*H04W 56/00* (2009.01)

(52) U.S. Cl.
CPC ........ *H04W56/0015* (2013.01); *H04W 72/042* (2013.01); *H04W 72/048* (2013.01); *H04W 72/0406* (2013.01); *H04W 72/0413* (2013.01)

(56) References Cited

U.S. PATENT DOCUMENTS

| | | | |
|---|---|---|---|
| 2006/0240838 | A1 | 10/2006 | Suh et al. |
| 2009/0316659 | A1 | 12/2009 | Lindoff et al. |
| 2011/0051711 | A1 | 3/2011 | Kishiyama et al. |
| 2011/0211541 | A1 | 9/2011 | Yuk et al. |

FOREIGN PATENT DOCUMENTS

| | | |
|---|---|---|
| JP | 2007-194868 A | 8/2007 |
| WO | 2007/083567 A1 | 7/2007 |
| WO | 2009/119834 A1 | 10/2009 |

OTHER PUBLICATIONS

"3rd Generation Partnership Project; Technical Specification Group Radio Access Network; Physical layer aspects for evolved Universal Terrestrial Radio Access (UTRA) (Release7)," 3GPP TR 25.814 V7.1.0, Technical Report, Sep. 2006, 132 pages.

"3rd Generation Partnership Project; Technical Specification Group Radio Access Network; Evolved Universal Terrestrial Radio Access (E-UTRA); Physical Channels and Modulation (Release 8)," 3GPP TS 36.211 V8.3.0, Technical Specification, May 2008, 77 pages.

"3rd Generation Partnership Project; Technical Specification Group Radio Access Network; Evolved Universal Terrestrial Radio Access (E-UTRA); Multiplexing and channel coding (Release 8)," 3GPP TS 36.212 V8.3.0, Technical Specification, May 2008, 48 pages.

"3rd Generation Partnership Project; Technical Specification Group Radio Access Network; Evolved Universal Terrestrial Radio Access (E-UTRA); Physical layer procedures (Release 8)," 3GPP TS 36.213 V8.3.0, Technical Specification, May 2008, 45 pages.

Baker, "LTE-Advanced Physical Layer," Alcatel-Lucent, REV-09003r1, Beijing, Dec. 17-18, 2009, 48 pages.

International Search Report, mailed Nov. 10, 2009, for International Application No. PCT/JP2009/003682, 4 pages.

"Long Term Evolution Protocol Overview," Freescale Semiconductor, White Paper, Oct. 2008, 21 pages.

LTE Toolbox, "SIB1 Recovery Example," retrieved from http://www.steepestascent.com/content/mediaassets/html/LTE/Help/SIB1%20Recovery%20 . . . , retrieved on Sep. 6, 2013, 5 pages.

NTT DoCoMo, Inc., "Proposals for LTE-Advanced Technologies," R1-081948, Agenda Item: 6.2, 3GPP TSG RAN WG1 Meeting #53, Kansas City, USA, May 5-9, 2008, 29 pages.

NTT DoCoMo, Inc., "Proposals for LTE-Advanced Technologies," R1-082575, Agenda Item: 12, 3GPP TSG RAN WG1 Meeting #53bis, Warsaw, Poland, Jun. 30-Jul. 4, 2008, 36 pages.

Sesia et al., "LTTE—The UMTS Long Term Evolution—A Pocket Dictionary of Acronyms," John Wiley & Sons, 2009, 96 pages.

ZTE, "Technical points for LTE-advanced," R1-081773, Agenda Item: 6.2, 3GPP TSG RAN1 53. meeting, Kansas, USA, May 5-9, 2008, 10 pages.

\* cited by examiner

BASE STATION, TERMINAL, BAND ALLOCATION METHOD, AND DOWNLINK DATA COMMUNICATION METHOD

BACKGROUND

1. Technical Field

The present invention relates to a base station, terminal, band assignment method and downlink data communication method.

2. Description of the Related Art

In 3GPP LTE, OFDMA (Orthogonal Frequency Division Multiple Access) is adopted as a downlink communication scheme. In a radio communication system adopting 3GPP LTE, a radio communication base station apparatus (which may be simply referred to as "base station" below) transmits a synchronization channel ("SCH") or broadcast channel ("BCH") using predetermined communication resources. Then, first, a radio communication terminal apparatus (which may be simply referred to as "terminal" below) secures synchronization with the base station by capturing the SCH. That is, first, the terminal performs a cell search. After that, the terminal obtains parameters unique to the base station (such as a frequency bandwidth) by reading the BCH information (see Non-Patent Literatures 1, 2 and 3).

Also, standardization of 3GPP LTE-advanced, which realizes faster communication than 3GPP LTE, has been started. The 3GPP LTE-advanced system (which may be referred to as "LTE+ system" below) follows the 3GPP LTE system (which may be referred to as "LTE system" below). In 3GPP LTE-advanced, to realize downlink transmission speed equal to or greater than maximum 1 Gbps, it is expected to adopt a base station and terminal that can perform communication in a wideband frequency equal to or greater than 20 MHz. Here, to prevent unnecessary complication of the terminal, the terminal side is expected to define the terminal capability related to frequency band support. The terminal capability defines that, for example, the minimum value of support bandwidth is 20 MHz.

That is, a base station supporting the LTE+ system (which may be referred to as "LTE+ base station" below) is formed to be able to perform communication in a frequency band including a plurality of "unit bands." Here, a "unit band" is a band of a 20-MHz range, including SCH (Synchronization CHannel) near the center, and is defined as a base unit of a communication band. Also, a "unit band" may be expressed as "component carrier(s)" in English in 3GPP LTE.

Also, terminals supporting the LTE+ system (which may be referred to as "LTE+ terminal" below) include a terminal in which a communication-capable bandwidth can contain only one unit band (which may be referred to as "type-1 LTE+ terminal" below) and a terminal in which a communication-capable bandwidth can contain a plurality of unit bands (which may be referred to as "type-2 LTE+ terminal" below).

CITATION LIST

Non-Patent Literature

NPL 1
3GPP TS 36.211 V8.3.0, "Physical Channels and Modulation (Release 8)," May 2008

NPL 2
3GPP TS 36.212 V8.3.0, "Multiplexing and channel coding (Release 8)," May 2008

NPL 3
3GPP TS 36.213 V8.3.0, "Physical layer procedures (Release 8)," May 2008

BRIEF SUMMARY

Technical Problem

Here, a case is assumed where an LTE+ base station supports an LTE+ terminal. FIG. 1 shows an example of mapping SCH and BCH in the LTE+ system support base station.

In FIG. 1, a communication bandwidth of the LTE+ base station is 40 MHz and includes two unit bands. Also, SCH and BCH are placed at 20 MHz intervals near the center frequency of each unit band. Here, a null carrier for DC offset compensation in a terminal is inserted in the center of each frequency band in which SCH and BCH are placed. Also, SCH and BCH are placed in 36 subcarriers each in the higher and lower frequency (i.e. a total of 72 subcarriers) from the center of the null carrier. Also, physical downlink control channels ("PDCCH's") are placed in a distributed manner in the whole unit bands.

Similar to a case of the above-noted LTE system, when powered on, the LTE+ terminal first tries capturing an SCH transmitted from the LTE+ base station by performing correlation synchronization processing while moving the center frequency of the communication band. Upon capturing the SCH transmitted from the LTE+ base station by peak detection in the correlation result, the LTE+ terminal captures a BCH transmitted from the LTE+ base station and reads the frequency band of the uplink pair band. Then, the LTE+ terminal starts communicating with the LTE+ base station by transmitting a signal in PRACH (Physical Random Access CHannel). Also, a unit band synchronized between the terminal and the base station may be referred to as "initial access unit band."

FIG. 2 illustrates an access condition of an LTE+ terminal (i.e. type-2 LTE+ terminal) that can perform communication in a communication bandwidth of 40 MHz, with respect to an LTE+ base station that transmits SCH and BCH by the mapping method shown in FIG. 1.

As shown in FIG. 2, the type-2 LTE+ terminal adjusts the center frequency of that terminal to the SCH frequency position in the initial access unit band and receives data signals transmitted from the LTE+ base station. Therefore, in spite of being able to receive data signals in 40 MHz continuous bands, the type-2 LTE+ terminal cannot cover the whole unit band adjacent to the initial access unit band. That is, actually, communication is performed only in the initial access unit band, and the capability of the LTE+ terminal is not utilized. Therefore, there is a problem that the LTE+ base station cannot assign a band to the type-2 LTE+ terminal efficiently.

FIG. 3 shows another example of mapping SCH and BCH in the LTE+ system support base station.

In FIG. 3, a communication bandwidth of the LTE+ base station is 40 MHz and includes two unit bands. Also, SCH and BCH are placed near the center frequency of the communication band.

According to the mapping method in FIG. 3, the LTE+ terminal adjusts the center frequency of that terminal to the SCH frequency position, so that it is possible to cover the whole communication band of the LTE+ base station by the communication band of that LTE+ terminal.

However, with the mapping method in FIG. 3, SCH and BCH are not mapped on 10 MHz bands at both ends, and, consequently, the LTE+ terminal, which has only 20 MHz terminal capability (i.e. type-1 LTE+ terminal), cannot use the 10 MHz bands at both ends. That is, with the mapping method in FIG. 3, frequency is wasted. Therefore, there is a problem that the LTE+ base station cannot assign a band to the type-1 LTE+ terminal efficiently.

FIG. 4 shows another example of mapping SCH and BCH in the LTE+ system support base station.

In FIG. 4, a communication bandwidth of the LTE+ base station is 40 MHz and includes two unit bands. Then, SCH and BACH are placed near the center frequency of the communication band and placed near the center frequencies of bands of 10 MHz bandwidth from the both ends.

According to the mapping method shown in FIG. 4, the type-1 LTE+ terminal can use bands of 10 MHz bandwidth from both ends. However, in the case where the type-2 LTE+ terminal uses 10 MHz bands at both ends as initial access unit bands, communication is possible only in a narrower band than the case of the mapping method shown in FIG. 2. That is, with the mapping method of FIG. 4, there is a problem that the LTE+ base station cannot assign a band to the type-2 LTE+ terminal efficiently, It is therefore an object of the present invention to provide a base station, terminal, band assignment method and downlink data communication method that enable efficient band assignment.

Solution to Problem

The base station of the present invention that can assign a plurality of unit bands to single communication, employs a configuration having: an obtaining section that obtains terminal capability information which is transmitted by a terminal in an initial access unit band and which indicates a communication-capable bandwidth of the terminal; and a control section that, when the terminal can have the plurality of unit bands in the communication-capable bandwidth indicated by the obtained terminal capability information, assigns a unit band group including a unit band adjacent to the initial access unit band in addition to the initial access unit band, to the terminal transmitting the obtained terminal capacity information, and transmits a communication band moving instruction to instruct for a reference frequency in a communication band of the terminal to be moved to a reference frequency in the unit band group, to the terminal using the initial access unit band.

The terminal of the present invention that receives a data signal transmitted from the above base station in the unit band group assigned from the base station, employs a configuration having: a reception section that receives the data signal; and a control section that makes the reception section start receiving the data signal in the initial access unit band before a moving process based on the communication band moving instruction starts, and continue the reception during a period of the moving process and after the period.

The band assignment method of the present invention for assigning a band used for data communication from a base station to a second terminal in a communication system including the base station that can assign a plurality of unit bands to single communication, a first terminal that can have only one unit band in a communication-capable bandwidth and the second terminal that can have the plurality of unit bands in a communication-capable bandwidth, includes: in a terminal, transmitting terminal capability information indicating a communication-capable bandwidth of the terminal in an initial access unit band for the base station; and, in the base station, when the terminal can have the plurality of unit bands in the communication-capable bandwidth indicated by the transmitted terminal capability information, assigning a unit band group including a unit band adjacent to the initial access unit band in addition to the initial access unit band, to the terminal, and transmitting a communication band moving instruction to instruct for a reference frequency in a communication band of the assignment target terminal to be moved to a reference frequency in the unit band group, to the assignment target terminal using the initial access unit band.

The downlink data communication method of the present invention including the steps of the above band assignment method, includes: starting downlink data communication between the base station and the terminal in the initial access unit band; and in the terminal, moving the reference frequency in the communication band of the terminal based on the communication band moving instruction, where the downlink data communication starts before a moving process of the reference frequency starts, and continues during a period of the moving process and after the period.

Advantageous Effects of Invention

According to the present invention, it is possible to provide a base station, terminal, band assignment method and downlink data communication method that enable efficient band assignment.

DETAILED DESCRIPTION

Figure 1:
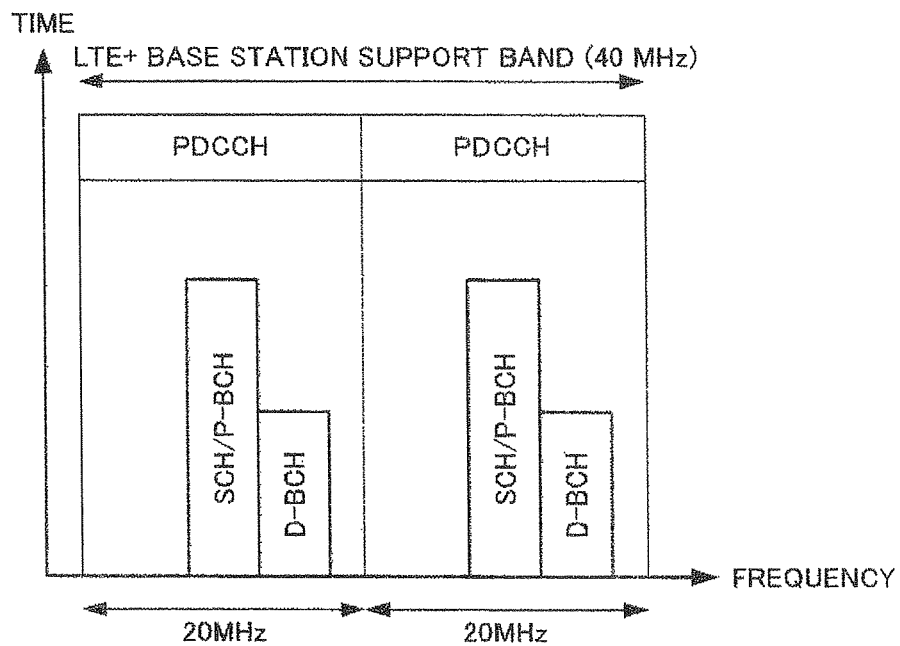
FIG. 1 shows an example of mapping SCH and BCH in an LTE+ system support base station.

Now, embodiments of the present invention will be explained in detail with reference to the accompanying drawings. Also, in embodiments, the same components will be assigned the same reference numerals and overlapping explanation will be omitted.

Embodiment 1

Figure 5:
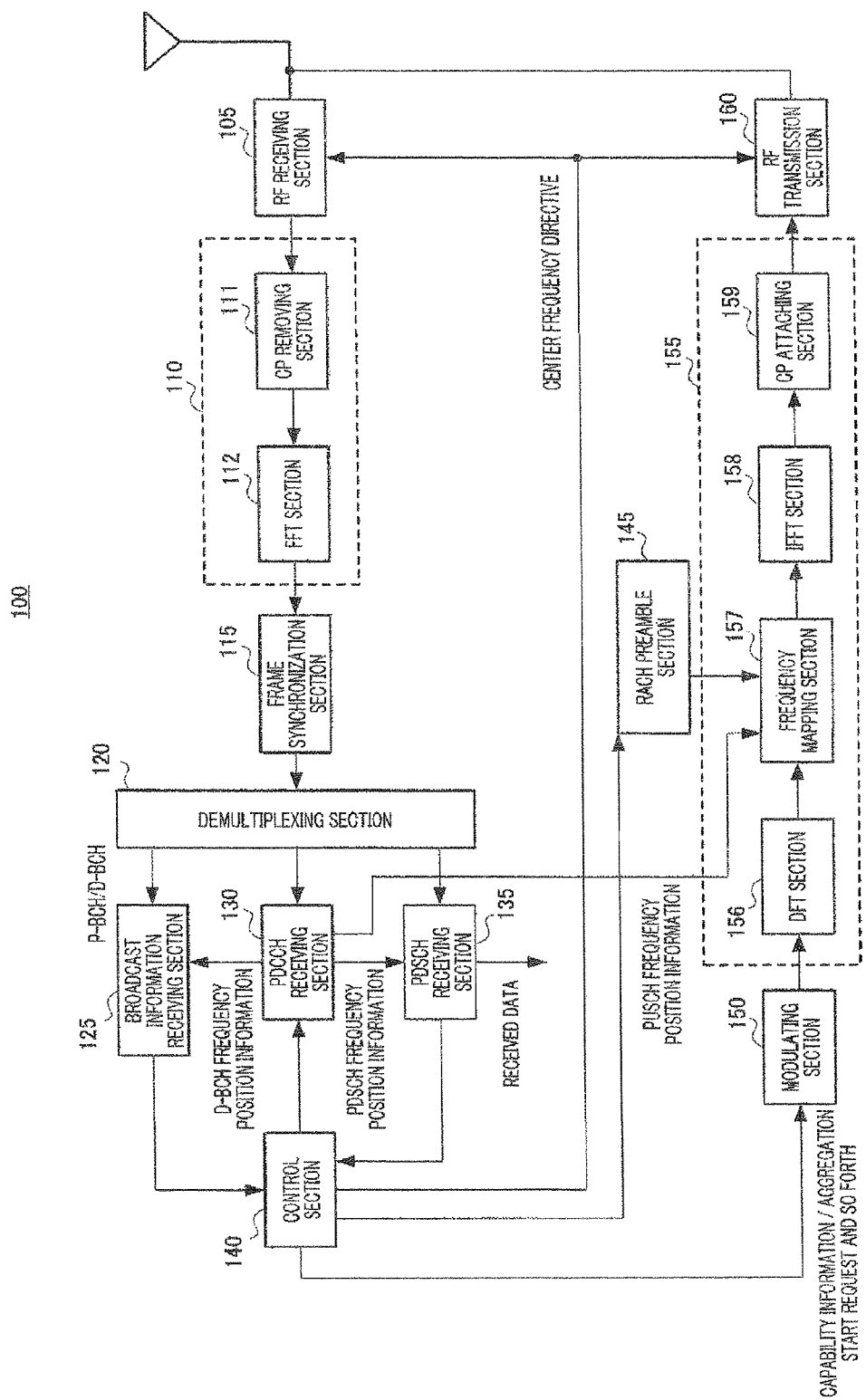
FIG. 5 is a block diagram showing a configuration of a terminal according to Embodiment 1 of the present invention.

[Terminal configuration] FIG. 5 is a block diagram showing a configuration of terminal 100 according to Embodiment 1 of the present invention. Terminal 100 is an LTE+ terminal in which the communication-capable bandwidth includes a plurality of unit bands. In FIG. 5, terminal 100 is provided with RF receiving section 105, OFDM signal demodulating section 110, frame synchronization section 115, demultiplexing section 120, broadcast information receiving section 125, PDCCH receiving section 130, PDSCH (Physical Downlink Shared CHannel) receiving section 135, control section 140, RACH (Random Access CHannel) preamble section 145, modulating section 150, SC-FDMA (Single-Carrier Frequency Division Multiple Access) signal forming section 155 and RF transmitting section 160.

RF receiving section 105 is formed to be able to change a reception band. RF receiving section 105 receives a center frequency directive from control section 140 and, by moving the center frequency based on this center frequency directive, moves the reception band. RF receiving section 105 performs radio reception processing (such as down-conversion and analog-to-digital (A/D) conversion) on a radio reception signal received in the reception band via an antenna, and outputs the resulting reception signal to OFDM signal demodulating section 110. Also, here, although the center frequency of the reception band is used as a reference frequency, it is equally possible to use an arbitrary frequency included in the reception band as the reference frequency.

OFDM signal demodulating section 110 has CP (Cyclic Prefix) removing section 111 and fast Fourier Transform (FFT) section 112. OFDM signal demodulating section 110 receives the reception OFDM signal from RF receiving section 105. In OFDM signal demodulating section 110, CP removing section 111 removes a CP from the reception OFDM signal and FFT section 112 transforms the reception OFDM signal without a CP into a frequency domain signal. This frequency domain signal is outputted to frame synchronization section 115.

Frame synchronization section 115 searches for a synchronization signal (SCH) included in the signal received from OFDM signal demodulating section 110 and finds synchronization with base station 200 (described later). A unit band included in the found synchronization signal (SCH) is used as the initial access unit band. The synchronization signal includes a P-SCH (Primary SCH) and S-SCH (Secondary SCH). To be more specific, frame synchronization section 115 searches for the P-SCH and finds synchronization with base station 200 (described later).

After finding the P-SCH, frame synchronization section 115 performs blind detection of the S-SCH placed in resources having a predetermined relationship with resources in which the P-SCH is placed. By this means, it is possible to find more precise synchronization and obtain the cell ID associated with the S-SCH sequence. That is, frame synchronization section 115 performs the same processing as in a normal cell search.

Frame synchronization section 115 outputs frame synchronization timing information related to the synchronization establishment timing, to demultiplexing section 120.

Demultiplexing section 120 demultiplexes the reception signal received from OFDM signal demodulating section 110 into the broadcast signal, control signal (i.e. PDCCH signal) and data signal (i.e. PDSCH signal) included in this reception signal, based on the frame synchronization timing information. The broadcast signal is outputted to broadcast information receiving section 125, the PDCCH signal is outputted to PDCCH receiving section 130, and the PDSCH signal is outputted to PDSCH receiving section 135. Here, the PDSCH includes individual information for a given terminal.

Broadcast information receiving section 125 reads the content of the input P-BCH (Primary BCH) and obtains information related to the number of antennas of base station 200 (described later) and downlink system bandwidth. This information is outputted to control section 140.

Broadcast information receiving section 125 receives a D-BCH signal placed in resources indicated by D-BCH (Dynamic BCH) resource position information (D-BCH frequency position information in this case) included in the PDCCH signal and extracted in PDCCH receiving section 130, and obtains information included in this received D-BCH signal (e.g. information about the frequency and frequency band of uplink pair band or PRACH (Physical Random Access CHannel)). This information is outputted to control section 140. Also, in this specification, an example case will be explained using frequency as resources.

Based on the decoding directive from control section 140, PDCCH receiving section 130 extracts information (including the frequency position in which the D-BCH is placed, the frequency position in which the PDSCH is placed, and uplink frequency allocation information (PDSCH frequency position information in this case)), included in the PDCCH signal received from demultiplexing section 120. Out of this extracted information, information about the frequency position in which the D-BCH is placed is outputted to broadcast information receiving section 125, information about the frequency position in which the PDSCH is placed is outputted to PDSCH receiving section 135, and the uplink frequency allocation information is outputted to SC-FDMA signal forming section 155.

PDSCH receiving section 135 extracts a communication band moving instruction from the PDSCH signal received from demultiplexing section 120, based on the information about the frequency position in which the PDSCH is placed, received from PDCCH receiving section 130. Then, the extracted communication band moving instruction is outputted to control section 140.

Here, the communication band moving instruction is a directive for moving the center frequency in the communication band of terminal 100 to the center frequency in the whole unit band group assigned from base station 200 (described later) to terminal 100 (hereinafter "assignment unit band group"). Here, in order to reduce the signaling amount required for the communication band moving instruction, the center frequency of the whole assignment unit band group to adjust in RF receiving section 105 of terminal 100 is reported as a multiple of 300 KHz, which is the lowest common multiple of the downlink subcarrier bandwidth (15 KHz) and the minimum resolution of frequency that can be set by RF receiving section 105 of terminal 100 (100 KHz). This is because, when an LTE+ base station transmits a plurality of SCH's using one IFFT circuit, the interval between SCH's is nothing but an integral multiple of 15 KHz, and, furthermore, needs to be a multiple of 100 KHz to adjust the center frequency of a reception band for any SCH on the terminal side.

Control section 140 sequentially changes the reception band of RF receiving section 105 before synchronization is established. Also, after synchronization is established and before an RACH preamble is transmitted, control section 140 prepares RACH preamble transmission in the initial access unit band based on the broadcast signal (P-BCH), control channel (PDCCH) and dynamic broadcast signal (D-BCH) transmitted from base station 200 (described later) in the initial access unit band including the frequency position of a synchronization channel. Also, after RACH preamble transmission in the initial access unit band, control section 140 obtains report resource assignment information reported by the control channel from base station 200 (described later), and transmits terminal capability information of that terminal using resources indicated by that report resource allocation information. At this stage, data communication is possible between base station 200 and terminal 100 in the initial access unit band. Then, control section 140 obtains the communication band moving instruction transmitted by base station 200 according to the terminal capability information, and, first, cuts off downlink data communication and then moves the center frequency in the communication band of terminal 100 to the center frequency in the whole assignment unit band group based on the communication band moving instruction.

Also, after cutting off downlink data communication in the initial access unit band, based on a broadcast signal, control channel and LTE dynamic broadcast signal transmitted in a unit band different from the initial access unit band in the assignment unit band group (hereinafter "additional assignment unit band"), control section 140 prepares RACH preamble transmission in the additional assignment unit band. Also, upon completing the preparation of RACH preamble transmission in the additional assignment unit band, first, control section 140 cuts off uplink communication between terminal 100 and base station 200 (described later) and then transmits the RACH preamble in the additional assignment unit band. Also, after transmitting the RACH preamble in the additional assignment unit band, control section 140 obtains the report resource assignment information reported by the control channel from base station 200, and using resources indicated by this report resource assignment information, transmits a communication starting request (aggregation communication starting request) for the whole unit band group assigned by base station 200, to base station 200.

To be more specific, control section 140 identifies PDCCH placement information based on the information obtained in broadcast information receiving section 125. This PDCCH placement information is uniquely determined by the number of antennas of base station 200 (described later) and downlink system bandwidth. Control section 140 outputs the PDCCH placement information to PDCCH receiving section 130 and commands decoding of a signal placed in the frequency position according to that information.

Also, control section 140 commands RACH preamble section 145 to transmit an RACH preamble according to information included in the D-BCH signal received from broadcast information receiving section 125, that is, according to the uplink frequency band and PRACH frequency position.

Also, upon receiving the uplink frequency allocation information from PDCCH receiving section 130, control section 140 outputs terminal capability information (i.e. capability information) of that terminal to modulating section 150 and outputs the uplink frequency allocation information to SC-FDMA signal forming section 155. By this means, the terminal capability information is mapped on frequency corresponding to the uplink frequency allocation information and then transmitted.

Also, based on the communication band moving instruction received from PDSCH receiving section 135, control section 140 outputs a center frequency directive to RF receiving section 105 such that the center frequency of the reception band of RF receiving section 105 matches the center frequency in the assignment unit band group. Here, control section 140 cuts off downlink data communication if the reception band is subjected to move control based on that communication band moving instruction.

According to the directive from control section 140, RACH preamble section 145 outputs an RACH preamble sequence and information related to the uplink frequency band and PRACH frequency position included in that directive, to SC-FDMA signal forming section 155.

Modulating section 150 modulates the terminal capability information received from control section 140 and outputs the resulting modulation signal to SC-FDMA signal forming section 155.

SC-FDMA signal forming section 155 forms an SC-FDMA signal from the modulation signal received from modulating section 150 and the RACH preamble sequence received from RACH preamble section 145. In SC-FDMA signal forming section 155, discrete Fourier transform (DFT) section 156 transforms the input modulation signal on the frequency axis and outputs a plurality of resulting frequency components to frequency mapping section 157. These plurality of frequency components are mapped on frequency based on the uplink frequency allocation information in frequency mapping section 157 and transformed into a time domain waveform in IFFT section 158. The RACH preamble sequence is also mapped on frequency based on the uplink frequency allocation information in frequency mapping section 157 and transformed into a time domain waveform in IFFT section 158. CP attaching section 159 attaches a CP to the time domain waveform and provides an SC-FDMA signal.

RF transmitting section 160 performs radio transmission processing on the SC-FDMA signal formed in SC-FDMA signal forming section 155 and transmits the result via an antenna.

Base Station Configuration

Figure 6:
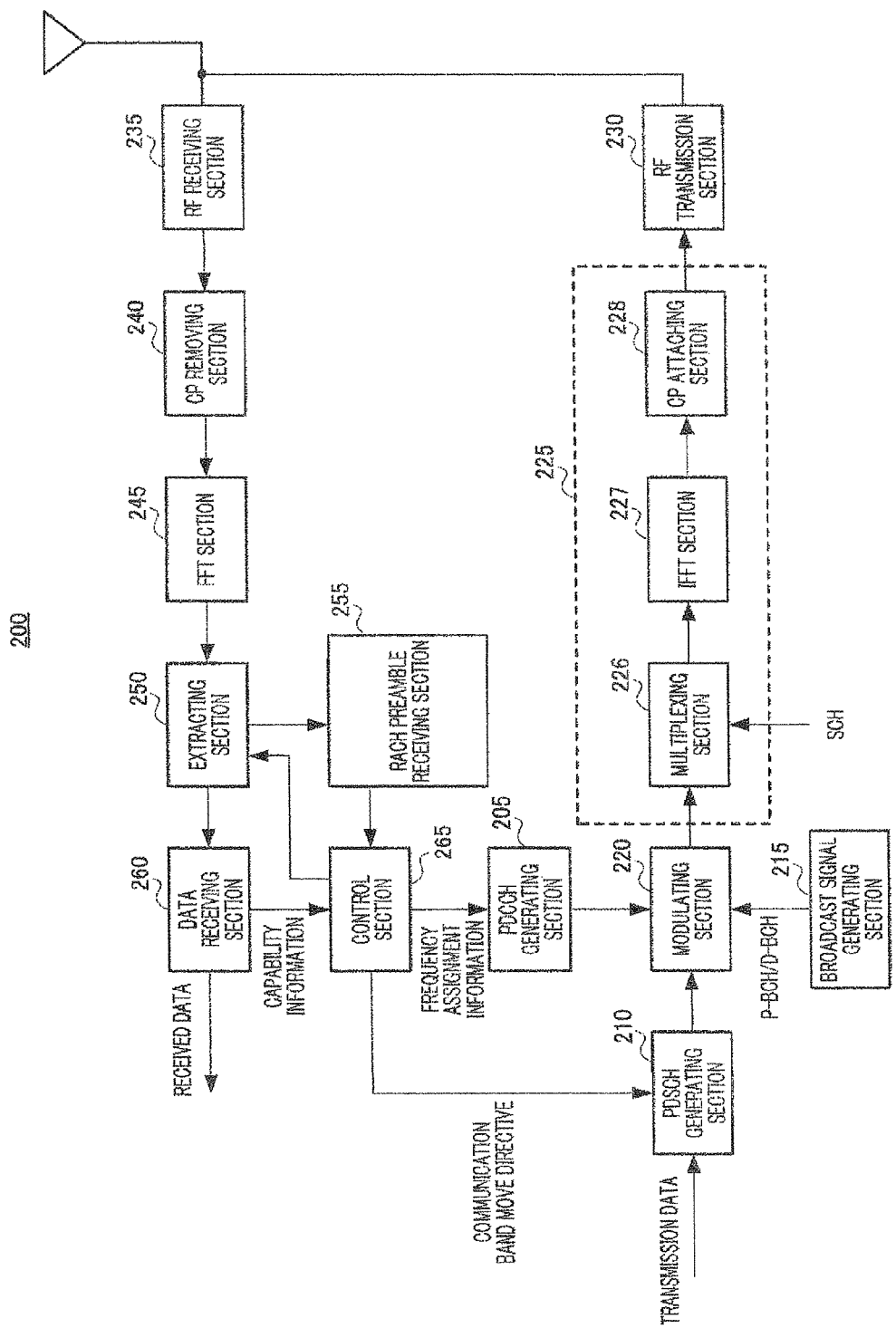
FIG. 6 is a block diagram showing a configuration of a base station according to Embodiment 1 of the present invention.

FIG. 6 is a block diagram showing a configuration of base station 200 according to Embodiment 1 of the present invention. Base station 200 is an LTE+ base station. In each unit band, base station 200 always continues to transmit a P-SCH, S-SCH, P-BCH, D-BCH and PDCCH representing frequency scheduling information of D-BCH, in an OFDM scheme. The BCH includes frequency band information, which divides a communication band every unit band. Therefore, a unit band is also defined as a band divided using frequency band information in BCH or a band defined by a distribution width upon placing PDCCH in a distributed manner.

In FIG. 6, base station 200 is provided with PDCCH generating section 205, PDSCH generating section 210, broadcast signal generating section 215, modulating section 220, OFDM signal forming section 225, RF transmitting section 230, RF receiving section 235, CP removing section 240, FFT section 245, extracting section 250, RACH preamble receiving section 255, data receiving section 260 and control section 265. CP removing section 240, FFT section 245, extracting section 250, RACH preamble receiving section 255 and data receiving section 260 form an SC-FDMA signal demodulating section.

PDSCH generating section 205 receives uplink frequency allocation information for terminal 100 and generates a PDCCH signal including this uplink frequency allocation information. PDCCH generating section 205 masks the uplink frequency allocation information by CRC based on an RACH preamble sequence transmitted from terminal 100, and then includes the result in the PDCCH signal. The generated PDCCH signal is outputted to modulating section 220. Here, a sufficient number of RACH preamble sequences are prepared, and the terminal selects an arbitrary sequence from these RACH preamble sequences and accesses the base station. That is, there is an extremely low possibility that a plurality of terminals access base station 200 at the same time using the same RACH preamble sequence, so that, by receiving a PDCCH subjected to CRC masking based on that RACH preamble sequence, terminal 100 can detect uplink frequency allocation information for that terminal without problems.

PDSCH generating section 210 receives a communication band moving instruction from control section 265 and generates a PDSCH signal including this communication band moving instruction. Also, PDSCH generating section 210 receives as input transmission data after transmission of the communication band moving instruction. Then, PDSCH generating section 210 generates a PDSCH signal including the input transmission data. The PDSCH signal generated in PDSCH generating section 210 is received as input in modulating section 220.

Broadcast signal generating section 215 generates and outputs a broadcast signal to modulating section 220. This broadcast signal includes P-BCH and D-BCH.

Modulating section 220 forms modulation signals by modulating input signals. These input signals include the PDCCH signal, PDSCH signal and broadcast signal. The formed modulation signals are received as input in OFDM signal forming section 225.

OFDM signal forming section 225 receives as input the modulation signals and synchronization signals (P-SCH and S-SCH) and forms an OFDM signal in which those signals are mapped on predetermined resources, respectively. In OFDM signal forming section 225, multiplexing section 226 multiplexes the modulation signals and the synchronization signals, and IFFT section 227 obtains a time domain waveform by performing serial-to-parallel conversion and then performing an IFFT of the multiplex signal. By attaching a CP to this time domain waveform in CP attaching section 228, the OFDM signal is provided.

RF transmitting section 230 performs radio transmission processing on the OFDM signal formed in OFDM signal forming section 225 and transmits the result via an antenna.

RF receiving section 235 performs radio reception processing (such as down-conversion and analog-to-digital (A/D) conversion) on a radio reception signal received in a reception band via the antenna, and outputs the resulting reception signal to CP removing section 240.

CP removing section 240 removes a CP from the reception SC-FDMA signal and FFT section 245 transforms the reception SC-FDMA signal without a CP into a frequency domain signal.

Extracting section 250 extracts a signal mapped on resources corresponding to RACH, from the frequency domain signal received from FFT section 245, and outputs the extracted signal to RACH preamble receiving section 255. This extraction of a signal mapped on resources corresponding to RACH is always performed so that an LTE+ terminal transmits an RACH preamble to base station 200 at any timing.

Also, extracting section 250 extracts a signal corresponding to uplink frequency allocation information received from control section 265, and outputs this signal to data receiving section 260. This extracted signal includes, for example, terminal capability information transmitted by terminal 100 in PUSCH.

First, RACH preamble receiving section 255 transforms the extracted signal received from extracting section 250 into a single carrier signal. That is, RACH preamble receiving section 255 includes an inverse discrete Fourier transform (IDFT) circuit. Then, RACH preamble receiving section 255 finds correlation between the resulting single carrier signal and an RACH preamble pattern, and, if the correlation value is equal to or greater than a certain level, decides that an RACH preamble is detected. Then, RACH preamble receiving section 255 outputs an RACH detection report including pattern information of the detected RACH preamble (e.g. the sequence number of the RACH preamble) to control section 265.

Data receiving section 260 transforms the extracted signal received from extracting section 250 into a single carrier signal on the time axis and outputs terminal capability information included in the resulting single carrier signal to control section 265. Also, after transmission of the communication band moving instruction, data receiving section 260 outputs the resulting single carrier signal to a higher layer as reception data.

Upon receiving the RACH detection report from RACH preamble receiving section 255, control section 265 allocates uplink frequency to terminal 100 having transmitted the detected RACH preamble. This allocated uplink frequency is used to, for example, transmit terminal capability information in terminal 100. Then, the uplink frequency allocation information is outputted to PDCCH generating section 205.

Also, upon receiving the terminal capability information from data receiving section 260, control section 265 decides the communication-capable bandwidth of the LTE+ terminal based on the terminal capability information. As a result of decision, if the communication-capable bandwidth indicated by the terminal capability information can contain a plurality of unit bands, control section 265 allocates a unit band group including a unit band adjacent to the initial access unit band in addition to the initial access unit band, to the transmission source terminal of the terminal capacity information (terminal 100 in this case), forms a communication band moving instruction to instruct for the center frequency in the communication band of the transmission source terminal to be moved to the center frequency in the whole unit band group, and outputs the communication band moving instruction to PDSCH generating section 210. Here, as described above, this communication band moving instruction includes information about the difference from the center frequency position in the RF receiving section of the RF receiving section of the terminal. This difference information has the value that is an integral multiple of 300 KHz. Similar to normal downlink data, the communication bend moving instruction is prepared for each terminal in PDSCH generating section 210 and then received as input in the modulating section.

Also, after outputting the communication band moving instruction, control section 265 cuts off downlink data communication with terminal 100. Then, upon receiving, from RACH preamble receiving section 255, the detection report of an RACH preamble transmitted in an additional assignment unit band from terminal 100, control section 265 allocates uplink frequency to terminal 100. This allocated uplink frequency is used to, for example, transmit terminal capability information in terminal 100. Then, the uplink frequency allocation information is outputted to PDCCH generating section 205.

Also, upon receiving an aggregation communication starting request from terminal 100, control section 265 starts communicating using the whole assignment unit band.

Operations of Terminal 100 and Base Station 200

Figure 7:
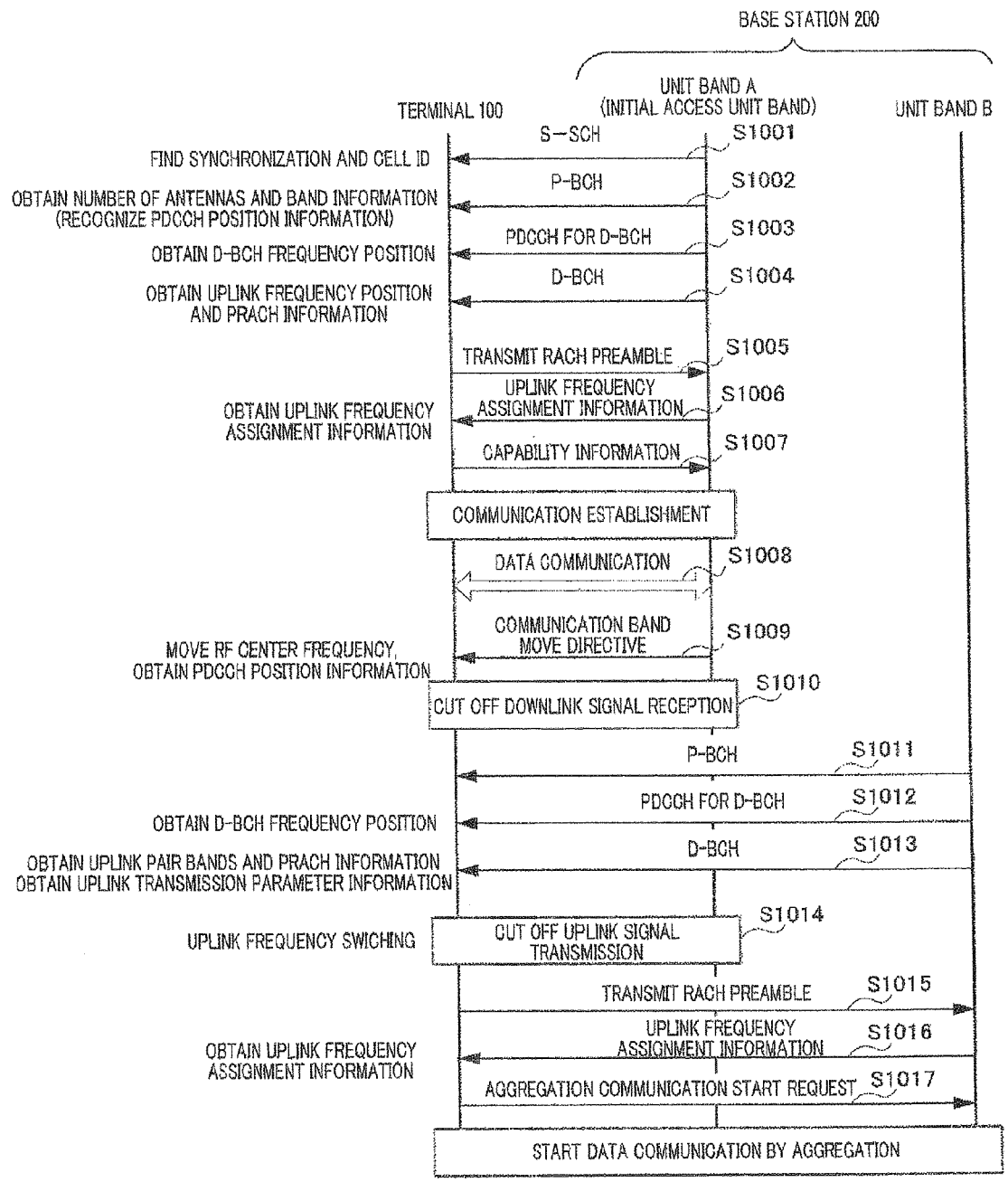
FIG. 7 is a sequence diagram showing signal transmission and reception between a terminal and a base station according to Embodiment 1 of the present invention.

FIG. 7 is a sequence diagram showing signal transmission and reception between terminal 100 and base station 200.

In step S1001, a synchronization signal is transmitted, and cell search processing is performed using this synchronization signal. That is, in step S1001, the reception band of RF receiving section 105 is sequentially shifted by control of control section 140, and frame synchronization section 115 searches for a P-SCH. By this means, the initial synchronization is established. Then, frame synchronization section 115 performs blind detection of an S-SCH placed in resources having a predetermined relationship with resources in which the P-SCH is placed. By this means, it is possible to find more precise synchronization and obtain the cell ID associated with the S-SCH sequence.

In step S1002 to step S1004, a broadcast signal and control channel are transmitted and used to prepare RACH preamble transmission in the initial access unit band.

That is, in step S1002, control section 140 identifies PDCCH placement information based on information included in a received D-BCH signal and obtained in broadcast information receiving section 125 (e.g. information about frequency and frequency band of uplink pair band or PRACH (Physical Random Access CHannel)). Then, control section 140 outputs the PDCCH placement information to PDCCH receiving section 130 and commands decoding of a signal placed in the frequency position based on the information.

In step S1003, according to the decoding directive from control section 140, frequency position information of the D-BCH is extracted in PDCCH receiving section 130.

In step S1004, based on the D-BCH frequency position information, information included in the received D-BCH signal (e.g. information about frequency and frequency band of uplink pair band or PRACH (Physical Random Access CHannel)) is extracted in broadcast information receiving section 125.

In step S1005, under control of control section 140, RACH preamble section 145 transmits an RACH preamble using the uplink frequency band and PRACH frequency position obtained in step S1002.

In step S1006, control section 265 of base station 200 having received the RACH preamble allocates uplink frequency to terminal 100 having transmitted the RACH preamble, and transmits uplink frequency allocation information to that terminal 100.

In step S1007, control section 140 of terminal 100 having received the uplink frequency allocation information transmits terminal capability information of that terminal, using the uplink frequency.

At this stage, base station 200 and terminal 100 are in conditions where communication is possible, and, in step S1008, data communication starts between base station 200 and terminal 100.

In step S1009, if the communication-capable bandwidth indicated by the received terminal capability information can contain a plurality of unit bands, control section 265 of base station 200 allocates a unit band group including a unit band adjacent to the initial access unit band in addition to the initial access unit band, to terminal 100 of the terminal capacity information, and transmits a communication band moving instruction to instruct for the center frequency in the communication band of terminal 100 to be moved to the center frequency in the whole unit band group.

First, in step S1010, terminal 100 having received this communication band moving instruction cuts off downlink data communication and then moves the center frequency in the communication band to the center frequency in the whole assignment unit band group based on the communication band moving instruction.

Figure 8:
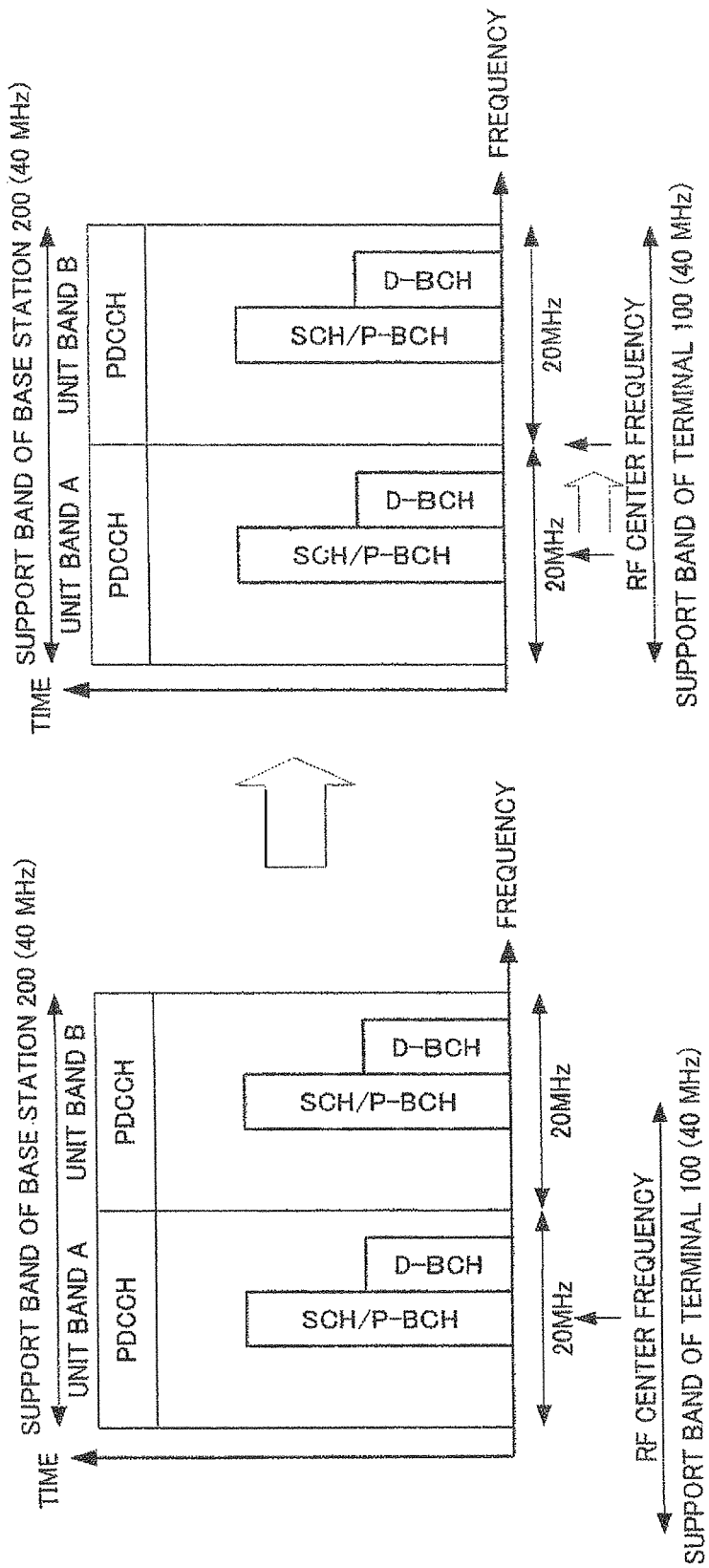
FIG. 8 illustrates a communication band moved by a terminal according to Embodiment 1 of the present invention.

FIG. 8 illustrates the communication band moved in terminal 100.

Figure 2:
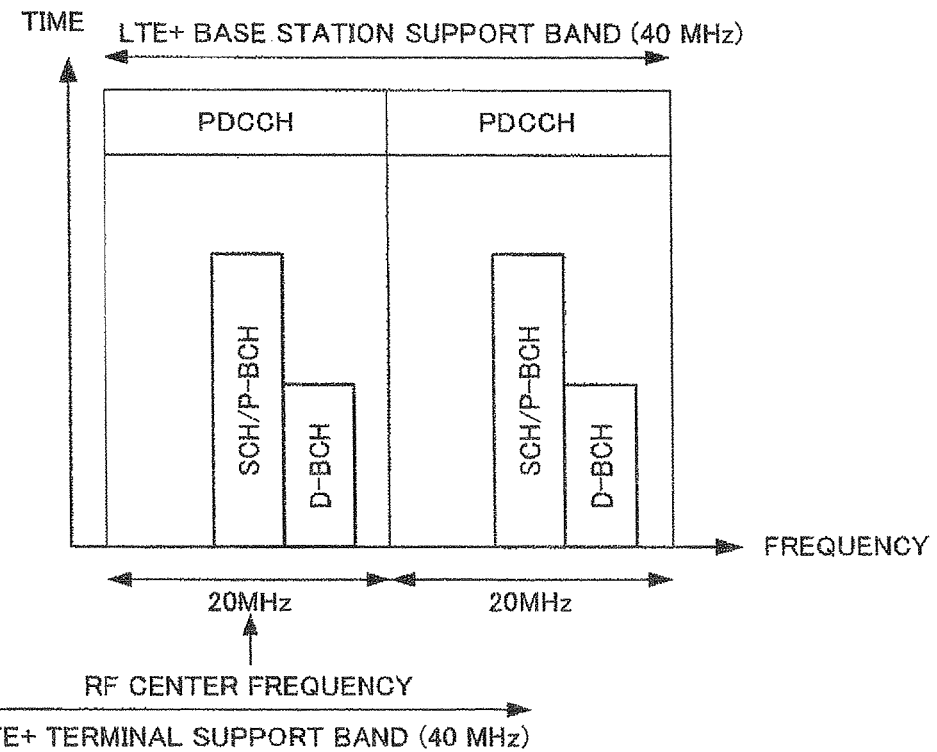
FIG. 2 illustrates an access condition of an LTE+ terminal that can perform communication in a 40 MHz communication bandwidth, with respect to an LTE+ base station that transmits SCH and BCH by the mapping method shown in FIG. 1.
Figure 3:
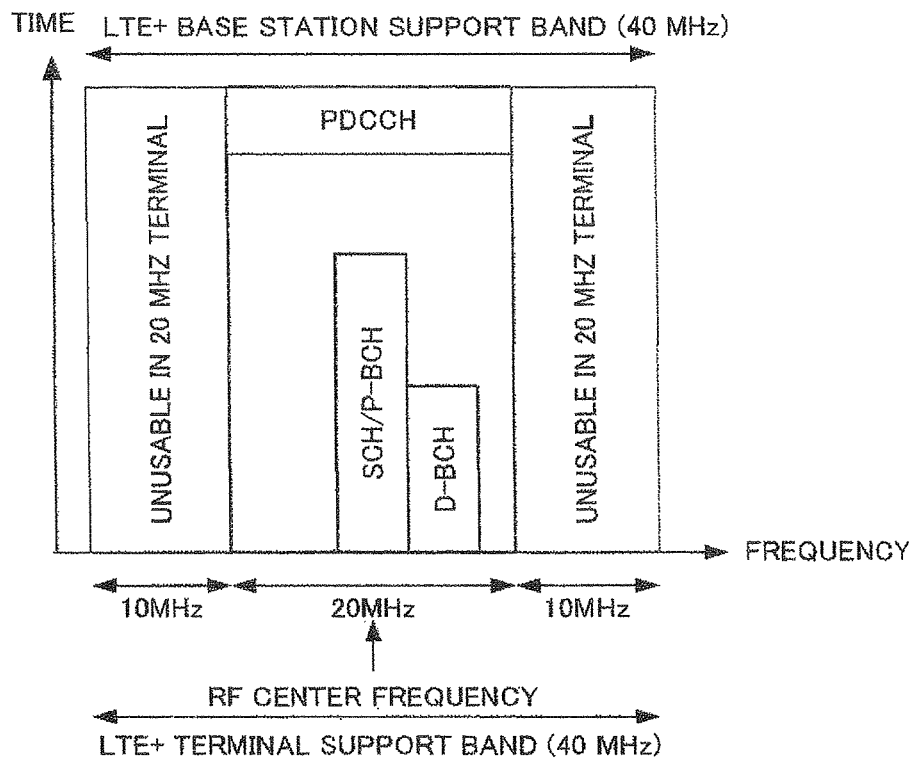
FIG. 3 shows another example of mapping SCH and BCH in an LTE+ system support base station.
Figure 4:
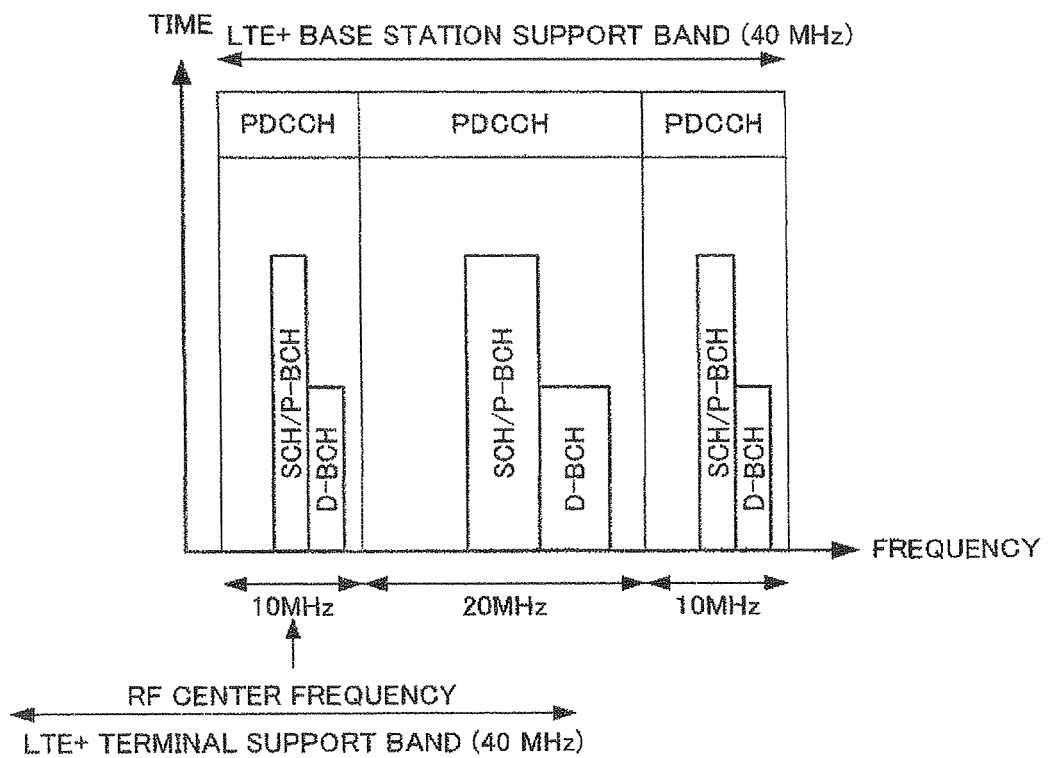
FIG. 4 shows another example of mapping SCH and BCH in an LTE+ system support base station.

As shown in the left side of FIG. 8, in step S1001 to step S1009, the center frequency of the communication band of terminal 100 matches the SCH frequency position in unit band A of the initial access unit band. In this condition, as explained using FIG. 2, the capability of terminal 100 is not utilized.

By contrast with this, by moving the center frequency of the communication band of terminal 100 in step S1010, as shown in the right side of FIG. 8, it is possible to contain the whole assignment unit band group in the communication band of terminal 100. Also, the width of each unit band is the same in FIG. 8, and therefore the center frequency of the communication band of terminal 100 matches the boundary frequency between unit band A and unit band B.

Referring back to the flow of FIG. 7, in step S1011 to step S1013, a broadcast signal and control channel are transmitted and used to prepare RACH preamble transmission in an additional assignment unit band.

Upon completing the preparation of the RACH preamble in the additional assignment unit band, control section 140 cuts off uplink communication between terminal 100 and base station 200 in step S1014, and transmits the RACH preamble in the additional assignment unit band in step S1015.

In step S1016, control section 265 of base station 200 having received the RACH preamble allocates uplink frequency to terminal 100 having transmitted the RACH preamble in the additional assignment unit band, and transmits uplink frequency allocation information to that terminal 100.

In step S1017, control section 140 of terminal 100 transmits an aggregation communication starting request using resources indicated by the uplink frequency allocation information transmitted from base station 200 in step S1016.

Upon receiving this aggregation communication starting request, control section 265 of base station 200 starts communicating using the whole assignment unit band group.

As described above, according to the present embodiment, in base station 200 in which a plurality of unit bands can be assigned in single communication, data receiving section 260 obtains terminal capability information transmitted by terminal 100 in the initial access unit band, and, when the communication-capable bandwidth indicated by that terminal capability information can contain a plurality of unit bands, assigns a unit band group including a unit band adjacent to the initial access unit band in addition to the initial access unit band, to terminal 100, and transmits a communication band moving instruction to instruct for the center frequency in the communication band of terminal 100 to be moved to the center frequency in that unit band group, to terminal 100 using the initial access unit band.

By this means, it is possible to contain the whole assignment unit band group in the communication band of terminal 100. That is, base station 200 that allows efficient band assignment for terminal 100 is realized.

Also, in the above explanation, the reference frequency of the reception band of terminal 100, the reference frequency of a unit band (i.e. SCH frequency position) and the reference frequency of an assignment unit band group have been explained as respective center frequencies. However, the present invention is not limited to this, and it is equally possible to use other frequency positions as the reference frequency. An essential requirement is that each reference frequency is determined such that the whole unit band is contained in the reception band of terminal 100 by adjusting the reference frequency of the reception band of terminal 100 to the reference frequency of the unit band and the whole assignment unit band group is contained in the reception band of terminal 100 by adjusting the reference frequency of the reception band of terminal 100 to the reference frequency of the assignment unit band group.

Embodiment 2

In Embodiment 1, when a terminal transmits an RACH preamble in an additional assignment unit band, RF frequency has to be switched to an uplink pair band corresponding to the additional assignment unit band, and, consequently, communication is momentarily cut off (i.e. condition in which an ACK to uplink data and downlink data cannot be transmitted) in the communication system. By contrast with this, in Embodiment 2, it is possible to realize a communication system in which efficient band assignment is possible without cutting off communication momentarily. Now, a terminal and base station forming this communication system will be explained.

Figure 9:
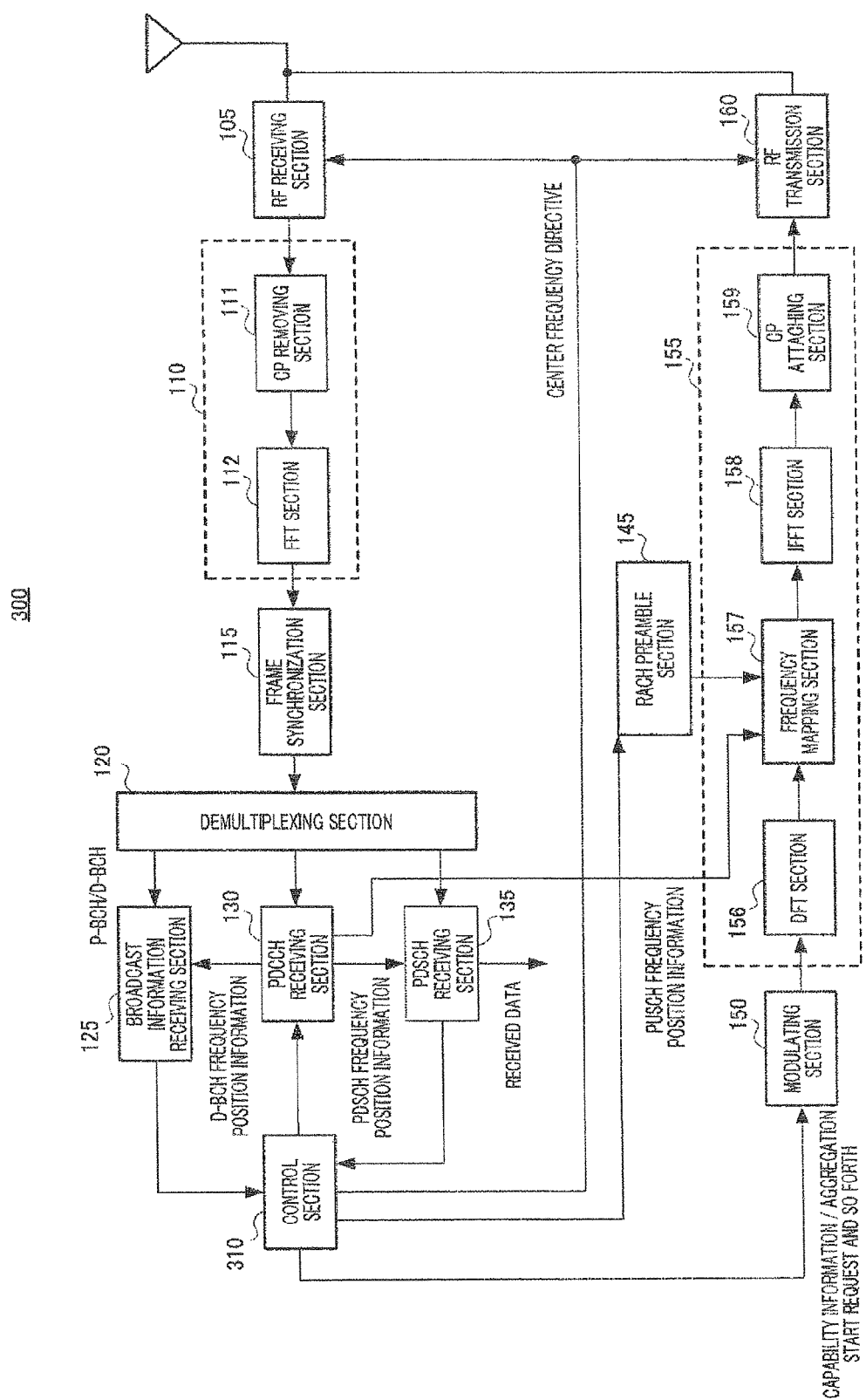
FIG. 9 is a block diagram showing a configuration of a terminal according to Embodiment 2 of the present invention.

FIG. 9 is a block diagram showing a configuration of terminal 300 according to Embodiment 2. In FIG. 9, terminal 300 has control section 310.

In control section 310, control processing from synchronization establishment to data communication between base station 200 and terminal 100 in the initial access unit band, is the same as the control processing in control section 140 of terminal 100 according to Embodiment 1.

Control section 310 obtains a communication band moving instruction transmitted according to terminal capability information from base station 400 (described later), and, based on this communication band moving instruction, moves the center frequency in the communication band of terminal 300 to the center frequency in the whole assignment unit band group. At this time, data communication between base station 400 and terminal 300 started in the initial access unit band before the center frequency moving process, is not cut off.

Here, base station 400 (described later) transmits the communication band moving instruction and all of the content of P-BCH transmitted in an additional assignment unit band (i.e. the content of MIB (Master Information Block)). To be more specific, the MIB includes the extension of PDCCH in the frequency axis direction (downlink frequency bandwidth), the number of antennas of the base station in the move destination band (i.e. the number of antennas to transmit a reference signal) and the number of OFDM resources used for others than PDCCH (e.g. a response signal to an uplink data signal). Further, base station 400 transmits the communication band moving instruction and information related to the SCH position and null carrier position in the additional assignment unit band.

Therefore, based on the obtained MIB, control section 310 obtains a control channel and LTE dynamic broadcast signal in the additional assignment unit band. Here, although terminal 100 according to Embodiment 1 performs, for example, RACH preamble transmission in the additional assignment unit band, terminal 300 does not perform that processing.

Upon obtaining the control channel and D-BCH (i.e. SIB (System Information Block)) in the additional assignment unit band, control section 310 transmits a read completion report of the SIB to base station 400 using an uplink pair band of the initial access unit band. This SIB read completion report is used as an aggregation communication starting request.

Figure 10:
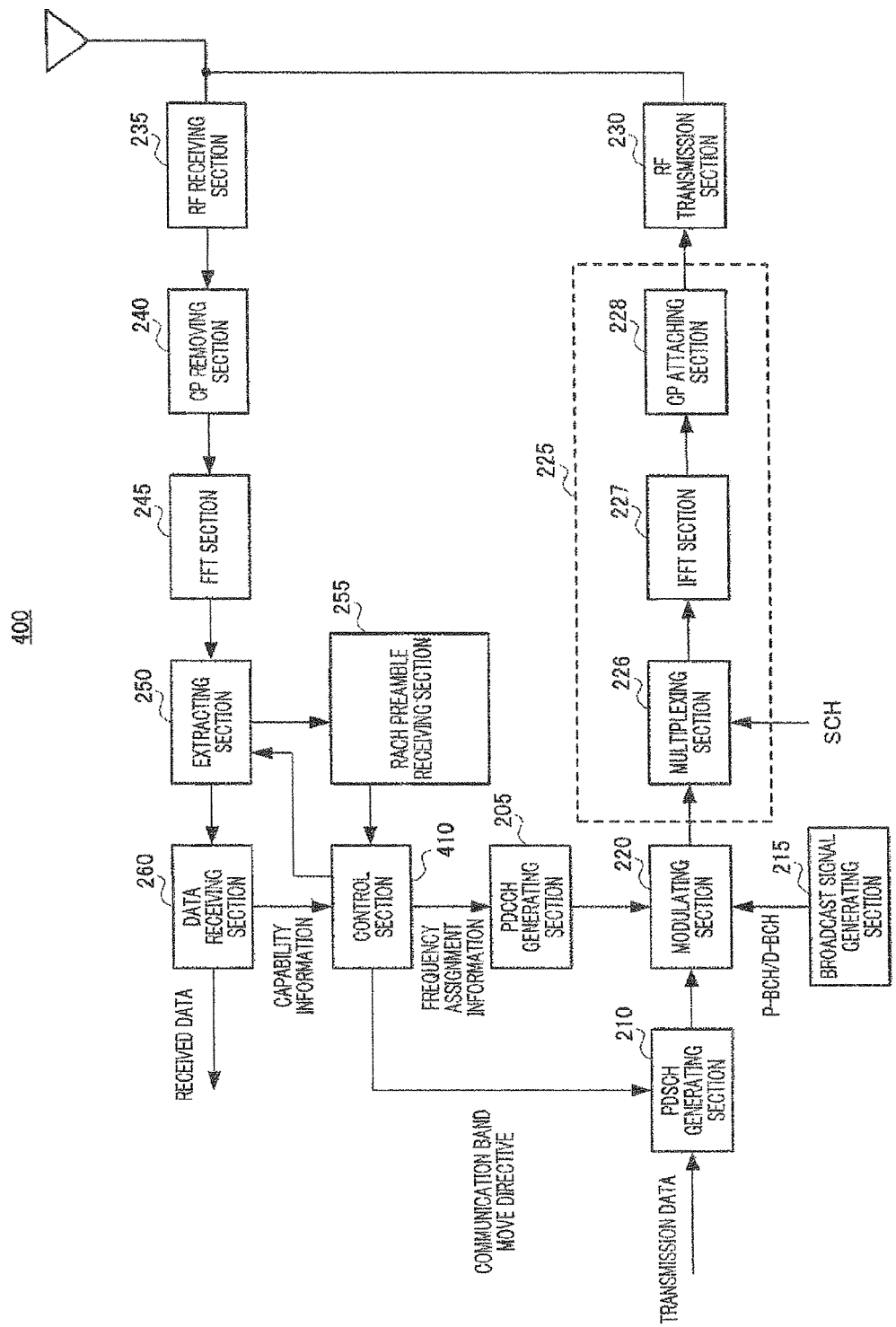
FIG. 10 is a block diagram showing a configuration of a base station according to Embodiment 2 of the present invention.

FIG. 10 is a block diagram showing a configuration of base station 400 according to Embodiment 2 of the present invention.

In FIG. 10, base station 400 has control section 410.

When the communication-capable bandwidth indicated by terminal capability information can contain a plurality of unit bands, control section 410 assigns a unit band group including a unit band adjacent to the initial access unit band in addition to the initial access unit band, to the transmission source terminal of the terminal capability information (terminal 300 in this case), forms a communication band moving instruction to indicate the center frequency in the communication band of the transmission source terminal to be moved to the center frequency in the whole unit band group, and outputs the communication band moving instruction to PDSCH generating section 210. Also, control section 410 outputs the communication band moving instruction, the content of MIB and information related to the SCH position and null carrier position, to PDSCH generating section 210.

Figure 11:
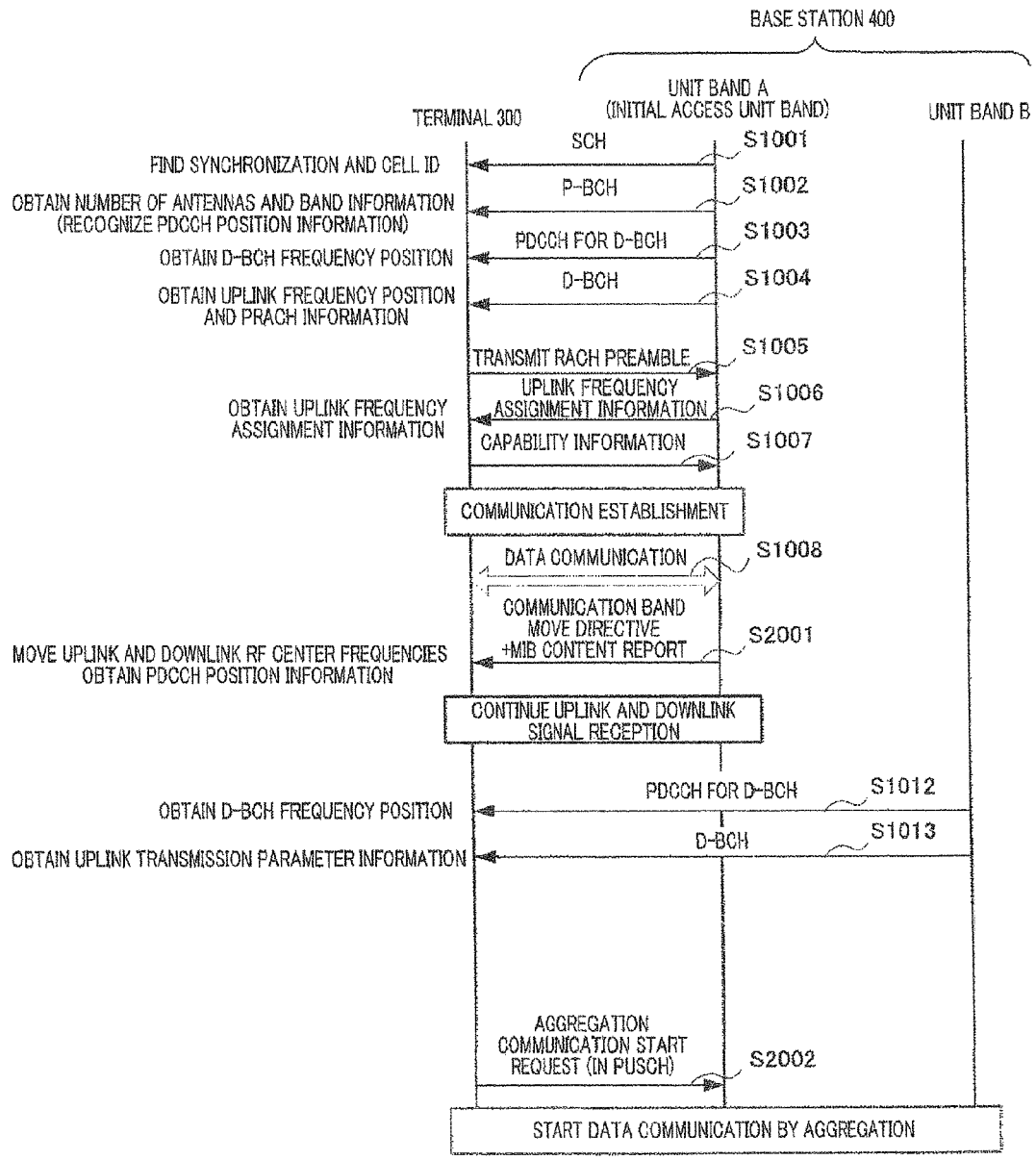
FIG. 11 is a sequence diagram showing signal transmission and reception between a terminal and a base station according to Embodiment 2 of the present invention.

FIG. 11 is a sequence diagram showing signal transmission and reception between terminal 300 and base station 400.

The sequence diagram of FIG. 11 and the sequence in FIG. 7 are the same in step S1001 to step S1008.

In step S2001, when the communication-capable bandwidth indicated by received terminal capability information can contain a plurality of unit bands, control section 410 of base station 400 assigns a unit band group including a unit band adjacent to the initial access unit band in addition to the initial access unit band, to terminal 300 of the terminal capacity information, and transmits a communication band moving instruction to instruct for the center frequency in the communication band of terminal 300 to be moved to the center frequency in the whole unit band group. Further, control section 410 transmits the communication band moving instruction, the content of MIB and information related to the SCH position and null carrier position in the additional assignment unit band.

Terminal 300 having received the communication band moving instruction moves the center frequency in the communication band to the center frequency in the whole assignment unit band group, based on the communication band moving instruction. At this time, data communication between base station 200 and terminal 100 started before the center frequency moving process in the initial access unit band, is not cut off. That is, reception of a downlink data signal in the initial access unit band starts before a moving process based on the communication band moving instruction starts, and this reception continues during the moving process period and after the end of this period.

After that, upon obtaining the control channel and D-BCH (i.e. SIB (System Information Block)) in the additional assignment unit band based on the MIB, control section 310 of terminal 300 transmits an aggregation communication starting request to base station 400 using an uplink pair band of the initial access unit band (step S2002).

As described above, according to the present embodiment, terminal 300 starts receiving a data signal in the initial access unit band before a moving process based on a communication band moving instruction starts, and continues the reception during the moving process period and after the end of this period. That is, communication in the initial access unit band is not cut off momentarily.

Also, according to the present embodiment, in base station 400, control section 410 transmits information used to identify a control channel transmitted in an additional assignment unit band, together with a communication band moving instruction in the initial access unit band.

By this means, terminal 300 needs not receive a P-BCH in the additional assignment unit band, so that it is possible to start aggregation communication earlier than in the case of Embodiment 1.

Also, in the above explanation, the reference frequency of the reception band of terminal 300, the reference frequency of a unit band (i.e. SCH frequency position) and the reference frequency of an assignment unit band group have been explained as respective center frequencies. However, the present invention is not limited to this, and it is equally possible to use other frequency positions as the reference frequency. An essential requirement is that each reference frequency is determined such that the whole unit band is contained in the reception band of terminal 300 by adjusting the reference frequency of the reception band of terminal 300 to the reference frequency of the unit band and the whole assignment unit band group is contained in the reception band of terminal 300 by adjusting the reference frequency of the reception band of terminal 300 to the reference frequency of the assignment unit band group.

Also, in the above explanation, MIB information of an additional assignment band is reported from base station 400 to terminal 300. However, the present invention is not limited to this, and base station 400 may report only the difference between MIB in the initial access unit band and MIB in the additional assignment unit band. By this means, it is possible to reduce the signaling amount.

Also, in the above explanation, MIB information is transmitted with a communication band moving instruction. However, the present invention is not limited to this, and it is equally possible to perform broadcasting to all terminals using, for example, the D-BCH of each unit band. By this means, at the stage of step S1004, terminal 300 can obtain MIB information in an additional assignment unit band.

Also, an aggregation communication starting request is not always transmitted by a PUCCH in the initial access unit band. For example, base station 400 may transmit the aggregation communication starting request by a certain specific RACH preamble in the initial access unit band.

Other Embodiment (1) Here, an index attached to a resource block (RB) used as a base unit in scheduling and so on, will be explained.

In Embodiment 2, terminal 300 receives a communication band moving instruction, SCH position, null carrier position and the MIB content in each unit band, from base station 400.

Here, as described above, the center frequency of the communication band of terminal 300 is moved to a position different from the position of SCH placed near the center of each unit band. That is, it follows that a null carrier is present in a position different from the center position of a frequency band in which an SCH is placed.

Each RB is formed with a certain number of carriers without null carriers. Therefore, terminal 300 needs to redefine RB's using information obtained from base station 400.

Therefore, first, with the system frequency bandwidth read from the SCH position and MIB content in a certain unit band, terminal 300 virtually calculates the extension of PDCCH in the unit band.

Next, terminal 300 checks whether or not a null carrier is present in other positions than the SCH center in the unit band. As a result, if there is a null carrier in a position apart from the SCH center, terminal 300 forms an RB using twelve subcarriers excluding the null carrier in the same way as other null carriers.

Figure 12:
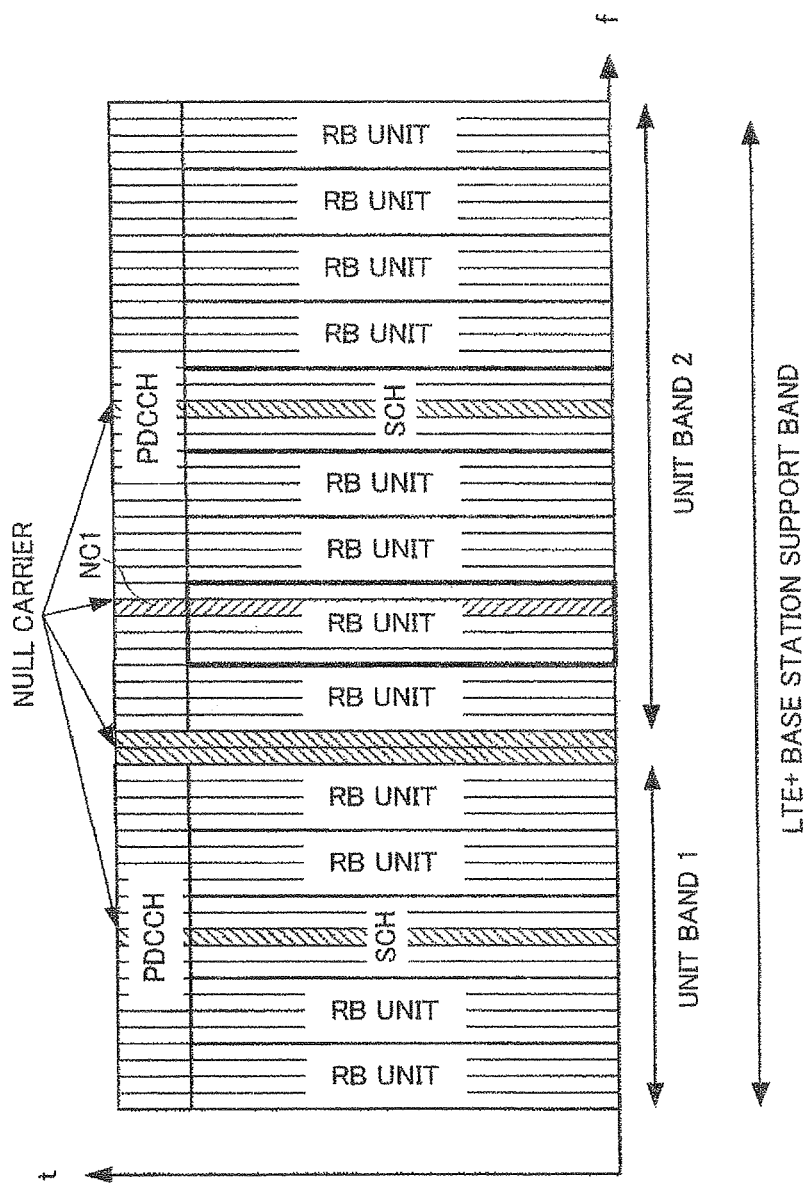
FIG. 12 illustrates RB formation.

FIG. 12 illustrates an RB form. NC1 in FIG. 12 represents a null carrier that is present in a position different from the SCH center. As shown in FIG. 12, similar to other null carriers, the null carrier that is present in a position different from the SCH center is removed from the RB-forming subcarriers to form RB's.

Here, the extension of PDCCH is set in RB units. Then, the number of RB's included in the PDCCH corresponds to the system frequency bandwidth on a one-to-one basis.

Therefore, terminal 300 recalculates the PDCCH extension calculated virtually (in RB units), taking into account the null carrier that is present in the position different from the SCH center, and determines the frequency band in which a PDCCH is finally placed.

(2) Although example cases have been described above with Embodiments 1 to 4 where the present invention is implemented with hardware, the present invention can be implemented with software.

Furthermore, each function block employed in the description of each of Embodiments 1 to 4 may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be regenerated is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-201006, filed on Aug. 4, 2008, including the specification, drawings and abstract, is incorporated herein by reference in its entirety.

INDUSTRIAL APPLICABILITY

The base station, terminal, band assignment method and downlink data communication method of the present invention are effective to allow efficient band assignment.

The invention claimed is:
1. A communication apparatus comprising:
a controller which, in operation, allocates a communication band to a user equipment, the communication band including a first component carrier and a second component carrier added to the first component carrier, in which a synchronization signal is mapped around a center of each of the first component carrier and the second component carrier, and
a transmitter which, in operation, transmits in the first component carrier on a Physical Downlink Shared Channel (PDSCH), to the user equipment, information including both: (i) first information, based on which the user equipment is operative to set a reference frequency of the communication band, and (ii) second information, based on which the user equipment is operative to acquire a Physical Downlink Control Channel (PDCCH) in the second component carrier, whereby the user equipment is operative to perform communication simultaneously on the first component carrier and the second component carrier,
wherein the second information includes a downlink frequency bandwidth of the second component carrier, a number of antennas for use in the second component carrier, and resources used to transmit a response signal in the second component carrier responsive to an uplink data signal.

2. The communication apparatus according to claim 1, which, in operation, initiates transmission of downlink data signal on the first component carrier prior to the reference frequency being set based on the first information.

3. The communication apparatus according to claim 1, wherein the transmitter transmits a message that includes the first information and the second information.

4. The communication apparatus according to claim 1, wherein the first component carrier is a component carrier used for communication between the user equipment and the communication apparatus before the reference frequency is set.

5. The communication apparatus according to claim 1, wherein the reference frequency relates to a center frequency of the first component carrier and a center frequency of the second component carrier.

6. The communication apparatus according to claim 1, wherein a maximum bandwidth of each of the first component carrier and the second component carrier is 20 MHz.

7. The communication apparatus according to claim 1, wherein a bandwidth of each of the first component carrier and the second component carrier is equal to or less than 20 MHz.

8. The communication apparatus according to claim 1, wherein a maximum bandwidth of the communication band including the first component carrier and the second component carrier is over 20 MHz.

9. A communication method comprising:
allocating a communication band to a user equipment, the communication band including a first component carrier and a second component carrier added to the first component carrier, in which a synchronization signal is mapped around a center of each of the first component carrier and the second component carrier, and
transmitting in the first component carrier on a Physical Downlink Shared Channel (PDSCH), to the user equipment, information including both: (i) first information, based on which the user equipment is operative to set a reference frequency of the communication band, and (ii) second information, based on which the user equipment is operative to acquire a Physical Downlink Control Channel (PDCCH) in the second component carrier, whereby the user equipment is operative to perform communication simultaneously on the first component carrier and the second component carrier,
wherein the second information includes a downlink frequency bandwidth of the second component carrier, a number of antennas for use in the second component carrier, and resources used to transmit a response signal in the second component carrier responsive to an uplink data signal.

10. The communication method according to claim 9, in which transmission of downlink data signal on the first component carrier is initiated prior to the reference frequency being set based on the first information.

11. The communication method according to claim 9, wherein the transmitting includes transmitting a message that includes the first information and the second information.

12. The communication method according to claim 9, wherein the first component carrier is a component carrier used for communication between the user equipment and the communication apparatus before the reference frequency is set.

13. The communication method according to claim 9, wherein the reference frequency relates to a center frequency of the first component carrier and a center frequency of the second component carrier.

14. The communication method according to claim 9, wherein a maximum bandwidth of each of the first component carrier and the second component carrier is 20 MHz.

15. The communication method according to claim 9, wherein a bandwidth of each of the first component carrier and the second component carrier is equal to or less than 20 MHz.

16. The communication method according to claim 9, wherein a maximum bandwidth of the communication band including the first component carrier and the second component carrier is over 20 MHz.

* * * * *